United States Patent [19]

Cornwell

[11] 3,819,388
[45] June 25, 1974

[54] FIREPROOFING, INSULATION AND SOUNDPROOFING MATERIAL

[76] Inventor: Charles E. Cornwell, 7104 Marlan Dr., Alexandria, Va. 22307

[22] Filed: June 5, 1972

[21] Appl. No.: 259,742

[52] U.S. Cl............ 106/86, 106/90, 106/109, 106/DIG. 2
[51] Int. Cl. .......... C04b 7/02, C04b 11/00
[58] Field of Search ............ 106/89, 90, DIG. 2, 86, 106/109

[56] References Cited
UNITED STATES PATENTS

| | | | |
|---|---|---|---|
| 2,009,146 | 7/1935 | New | 106/86 |
| 2,377,491 | 6/1945 | Goodrich et al. | 106/86 |
| 2,598,980 | 6/1952 | Denning | 106/86 |
| 2,598,981 | 6/1952 | Denning | 106/86 |
| 2,733,995 | 2/1956 | Robinson | 106/90 |
| 2,913,346 | 11/1959 | Hoffman | 106/111 |
| 3,008,843 | 11/1961 | Jolly | 106/90 |
| 3,147,128 | 9/1964 | Harrell | 106/105 |
| 3,223,082 | 12/1965 | Smith | 106/111 |
| 3,307,588 | 3/1967 | Hylak | 106/90 |
| 3,573,941 | 4/1971 | Edwards et al. | 106/90 |

Primary Examiner—Delbert E. Gantz
Assistant Examiner—James W. Hellwege

[57] ABSTRACT

Method for the preparation of a cementitous composition having a cellular structure for protecting steel and other structural elements from fire. By spraying directly upon the desired structural substrate; a composition containing gypsum cement, filler or lightweight aggregates, water, and ½ percent to 2 percent by weight of a non ionic detergent such as a polyethylene glycol ether combined with 9 moles of ethylene oxide. This same composition is suitable and useful for thermal insulation and acoustical soundproofing. It can be mixed and applied in well known conventional techniques, such as spraying, casting or trowled. Portland cemenet or magnesia cements may be substituted for gypsum cement with similar results.

4 Claims, No Drawings

FIREPROOFING, INSULATION AND SOUNDPROOFING MATERIAL

BACKGROUND OF THE INVENTION

1. Field of the Invention

This invention relates to the preparation of a cementitious composition having a cellular structure that provides a barrier between the substrate and fire. The cellular nature of the composition further provides insulation and soundproofing where required. It is suitable for a lighter weight gypsum wall board with the above mentioned qualities.

2. The Prior Art

It has been known in the past to spray a foamed cementitious material over steel for protection and insulation against fire. Such formulations have been described in Checho and Umansky U.S. Pat. No. 3,522,069 granted on July 28, 1970; Fraser U.S. Pat. No. 3,458,327 granted on July 29, 1969; Harrell U.S. Pat. No. 3,147,128 granted on Sept. 1, 1964.

Foamed magnesia cement formulations are well known. Several inventions use a pre-formed foam, such as Checho and Umansky U.S. Pat. No. 3,522,069, with their composition, others use a mixing technique to introduce air into the material by agitation and forced air penetrations. However, most of the aeration produced by these various methods are lost during pumping and spraying operations. The introduction of paper fibers, asbestos fibers, rock wool, uncoated fiberglass usually wad or ball up causing pump breakdowns and spraygun jams. When a jam at the spraygun nozzle occurs, there is a fast build up of pressure that immediately breaks down the foams and the density of the material usually triples, causing the undesirable emission of varying degrees of material density. This density build up is highly likely to occur as in U.S. Pat. No. 3,522,069 granted on July 28, 1970. This method is complicated, and expensive equipment is required to process these materials to the point of application.

SUMMARY OF THE INVENTION

In accordance with the invention, a method is provided for adding within the mixture the precise amount of a bubble forming additive known as a non ionic detergent, Tergitol 155S9, which consists of a polyethylene glycol ether combined with 9 moles of ethylene oxide. This bubble forming agent provides the means for mixing a cementitious composition that forms a cellular structure with equal distribution of the cells throughout the composition.

A uniformed consistency of the density is maintained at all times with the use of this non ionic detergent when mixed with the slurry. This composition is shown in the examples listed below. The first example uses gypsum cement, the second uses Portland cement and the third uses magnesia cement. The light weight aggregates can be substituted as availability warrants. The use of vermiculite, perlite, a product called "SNOWDON" by Hercules Company, or other aggregates may be used for desired strengths and densities.

Example 1

| Ingredient | Parts by Weight |
|---|---|
| Gypsum Cement | 50 – 100 |
| Vermiculite | 10 – 45 |
| Water | 100 – 200 |

Example 1 -Continued

| Ingredient | Parts by Weight |
|---|---|
| Non Ionic Detergent | .25 – 2.0 |
| Optional – (Polyvinyl Acetate) | 1.0 – 5.0 |

Example 2

| Ingredient | Parts by Weight |
|---|---|
| Portland Cement | 50 – 100 |
| Vermiculite | 10 – 45 |
| Water | 100 – 200 |
| Non Ionic Detergent | .25 – 2.0 |
| Optional (Polyvinyl Acetate) | 1.0 – 5.0 |

Example 3

| Ingredient | Parts by Weight |
|---|---|
| Magnesia | 5 – 35 |
| Magnesium Salt | 5 – 35 |
| Vermiculite | 10 – 45 |
| Water | 100 – 200 |
| Non Ionic Detergent | .25 – 2.0 |
| Optional (Polyvinyl Acetate) | 1.0 – 5.0 |

By adding appropriate proportions of the non ionic detergent to such slurry compositions the material will air dry having densities as little as 10 pounds per cubic foot to approximately 35 pounds per cubic foot. The cement to water ratios determine the actual strength of the composition. The amount of the non ionic detergent determines the cellular content.

The liquid polyvinyl acetate is added to the composition when required for the purpose of adding greater adhesion to the surface being sprayed; i.e., overhead structures. The addition of polyvinyl acetate in appropriate proportions does not deter the inherent fireproofing qualities or cellular structure.

The cellular structure of this material has inherent insulating and acoustical values not generally available in other products that are currently used. The spraying, casting or trowled application of this composition lends itself to many applications. Spraying an appropriate thickness of this material over steel will meet ASTM fireproof ratings. When cast or pumped into wall structures, as the inner core, the material provides a "fire wall" barrier. It further provides acoustical soundproofness that is valuable in homes and commercial buildings, as well as in helping the control of ecological sound transmission or suppression.

The equipment required to form this slurry composition is all standard. The mixer can be either the standard paddle mortar mixer or the ribbon type. The rotating drum type is not recommended. Mixing times need not exceed 2 to 3 minutes per batch.

Spraying this composition is accomplished by pouring the mix into a hopper with connecting pump such as a Clipper P-30, Squeez - crete or Essick. These pumps are suitable for the pumping of the material. The Anning-Johnson or R-Tex nozzle is suitable for spraying.

What is claimed is:

1. A cementitious composition having a dry density in the range of 10–35 pounds per cubic foot comprising 50–100 parts by weight of a cement selected from the group consisting of gypsum and portland cement, 10–45 parts by weight of a light weight mineral aggregate, and one-fourth to two parts by weight of a non ionic detergent.

2. The composition of claim 1 further comprising one to five parts by weight of polyvinyl acetate.

3. The composition of claim 1 in which the light weight aggregate is vermiculite.

4. The composition of claim 1 in which the nonionic detergent is a polyethylene glycol ether combined with 9 moles of ethylene oxide.

* * * * *